United States Patent
Longhurst et al.

(10) Patent No.: US 9,712,796 B2
(45) Date of Patent: Jul. 18, 2017

(54) METADATA FOR USE IN COLOR GRADING

(71) Applicant: Dolby Laboratories Licensing Corporation, San Francisco, CA (US)

(72) Inventors: Peter W. Longhurst, Vancouver (CA); William Brent Wilson, Belcarra (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 211 days.

(21) Appl. No.: 14/681,726

(22) Filed: Apr. 8, 2015

(65) Prior Publication Data

US 2015/0215594 A1 Jul. 30, 2015

Related U.S. Application Data

(62) Division of application No. 13/693,567, filed on Dec. 4, 2012, now Pat. No. 9,035,965.

(60) Provisional application No. 61/567,528, filed on Dec. 6, 2011.

(51) Int. Cl.
| | | |
|---|---|---|
| *H04N 9/64* | (2006.01) | |
| *G11B 27/034* | (2006.01) | |
| *H04N 9/77* | (2006.01) | |

(52) U.S. Cl.
CPC ............ *H04N 9/64* (2013.01); *G11B 27/034* (2013.01); *H04N 9/77* (2013.01)

(58) Field of Classification Search
CPC ............ H04N 21/44; H04N 21/44016; H04N 2201/3266; G11B 27/031
See application file for complete search history.

(56) References Cited

U.S. PATENT DOCUMENTS

| | | | |
|---|---|---|---|
| 6,097,853 A | 8/2000 | Gu | |
| 6,337,692 B1 | 1/2002 | Rai | |
| 6,865,293 B2 | 3/2005 | Sobol | |
| 7,583,355 B2 | 9/2009 | Bogdanowiez | |
| 7,684,096 B2 | 3/2010 | Gonsalves | |
| 7,894,687 B2 | 2/2011 | Kubo | |
| 8,718,448 B2 * | 5/2014 | Lin ...................... | G11B 27/005 348/222.1 |
| 9,251,855 B2 * | 2/2016 | Graves ................. | G11B 27/031 |
| 2004/0227964 A1 | 11/2004 | Fujino | |
| 2007/0077025 A1 | 4/2007 | Mino | |
| 2009/0141975 A1 | 6/2009 | Li | |
| 2010/0080457 A1 | 4/2010 | Stauder | |
| 2010/0281383 A1 * | 11/2010 | Meaney ............... | G11B 27/031 715/723 |
| 2010/0329646 A1 | 12/2010 | Loeffler | |
| 2014/0333660 A1 | 11/2014 | Ballestad | |

* cited by examiner

*Primary Examiner* — Antonio A Caschera

(57) ABSTRACT

Methods and systems for color grading video content are presented. A component (e.g. a frame, a shot and/or a scene) of the video content is designated to be a master component and one or more other components of the video content are designated to be slave components, each slave component associated with the master component. A master component color grading operation is performed to the master component. For each one of the slave components, the master component color grading operation is performed to the slave component and a slave color grading operation that is specific to the one of the slave components is also performed. Metadata, which form part of the video content, are created to provide indicators on to whether components of the video are designated as master or slave components.

24 Claims, 7 Drawing Sheets

METADATA FOR USE IN COLOR GRADING

CROSS REFERENCE TO RELATED APPLICATIONS

This application is a divisional of U.S. patent application Ser. No. 13/693,567, filed on Dec. 4, 2012, which claims the benefit of priority to U.S. Provisional Patent Application Ser. No. 61/567,528, filed on Dec. 6, 2011, each of which is hereby incorporated by reference in its entirety.

TECHNICAL FIELD OF THE INVENTION

The technology disclosed herein relates to color grading of video content. Particular embodiments provide metadata that is useful for color grading of digital video content.

BACKGROUND OF THE INVENTION

FIG. 1 illustrates a makeup of digital video content 10 which may be broken down into frames 12, shots 14 and scenes 16. Typically, a frame 12 is a single image, a shot 14 typically comprises a plurality of frames 12 but may comprise as few as one frame 12 and a scene 16 typically comprises a plurality of shots 14 but may comprise as few as one shot 14. Typically, a director or producer will decide on a sequence of frames 12, shots 14 and scenes 16 that makeup video content 10. By way of non-limiting example, a scene 16 may take place in a particular environment (e.g. the inside of a store) and the shots 14 that make up scene 16 may comprise image frames 12 of different characters talking (e.g. a first shot 14 may corresponding to frames 12 where a camera is focused on a first character while the first character is talking and a second shot 14 may correspond to frames 12 where the camera is focused on a second character while the second character is talking).

Color grading (also known as color correction) is a process which typically involves manipulation of one or more frames 12 of video content 10. Typically, color grading is performed on a shot-by-shot basis (i.e. manipulation of shots 14), although color grading may be performed on a frame-by-frame basis (i.e. manipulation of frames 12) or even on portions of frames 12 (e.g. on objects within frames 12) using masks or power windows or the like. Non-limiting examples of the types of manipulations that could be performed during a color grading operation include: changing the contrast; changing luminosity; changing colors (e.g. by changing the intensities or values associated with red, blue, green or other color model values); changing white balance; overlaying a hue or tint, and/or the like.

A colorist typically uses color grading to achieve a number of objectives which may include: correcting for deficiencies in the image acquisition process, making sure that adjacent frames 12, shots 14 and/or scenes 16 flow together well, adding creative intent (e.g. feeling, mood, emotion, etc.) to video content 10; and/or the like.

As mentioned above, color grading tools typically permit a colorist to grade frames 12 and/or shots 14 independently. However, in many instances, the same or similar color grading processes will be used for multiple frames 12 and/or multiple shots 14. Some currently available color grading tools permit colorists to copy manipulations performed on one shot 14 to another shot 14 (e.g. by saving the color grading operations performed on a first shot 14 and transferring these manipulations to a second shot 14). This process of copying, saving and transferring is inefficient. Some currently available color grading tools permit colorists to apply a first sequence of color grading operations to all shots 14 in video content 10 in what is known as a "first light" grade. Such global color grading is insufficiently flexible from a creative perspective.

There is a general desire for methods and systems for color grading which permit video content 10 to be color graded with relatively high efficiency while maintaining a relatively high level of creative flexibility.

One particular type of color grading operation is known as a trim pass. A trim pass is typically used to manipulate video content for display on different rendering or display devices or for different delivery pipelines. For example, a trim pass may be used to re-grade video content that is originally prepared for display in a cinema having a certain type of projector, so that the re-graded content may be made suitable for delivery via streaming internet for display on a conventional LCD monitor or suitable for broadcasting over a cable network for display on a television. Performing trim pass color grading operations can be time consuming, since a trim pass may involve manipulation of every frame 12 or shot 14 of video content 10. A global or "first light" grade may not provide sufficient flexibility for trim pass color grading from a creative perspective.

There is a general desire for methods and systems for efficiently performing trim pass color grading operations while maintaining a relatively high level of creative flexibility.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for color grading video content, the method comprising: designating a particular component of the video content to be a master component; designating one or more other components of the video content to be slave components, each slave component associated with the master component; performing a master component color grading operation to the master component; and, for each one of the slave components: performing the master component color grading operation to the slave component; and performing a slave color grading operation that is specific to the one of the slave components.

Another aspect of the invention provides a method for trim pass color grading video content, the method comprising: assigning an importance metric to each of a plurality of components of the video content; selecting a subset of the plurality of components for grading during a trim pass color grading based at least in part on the importance metric assigned to each of the plurality of components; and facilitating application of trim pass color grading operations by a colorist only on the selected subset of the plurality of components.

Other aspects of the invention comprise systems for processing video content, the systems comprising processors configured to perform methods according to various aspects of the invention. Other aspects of the invention comprise computer program products embodied on non-transitory media, the computer program products comprising computer-readable instructions which, when executed by a suitable processor, cause the processor to perform methods according to various aspects of the invention.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate non-limiting embodiments of the invention.

DESCRIPTION OF THE INVENTION

Figure 1:
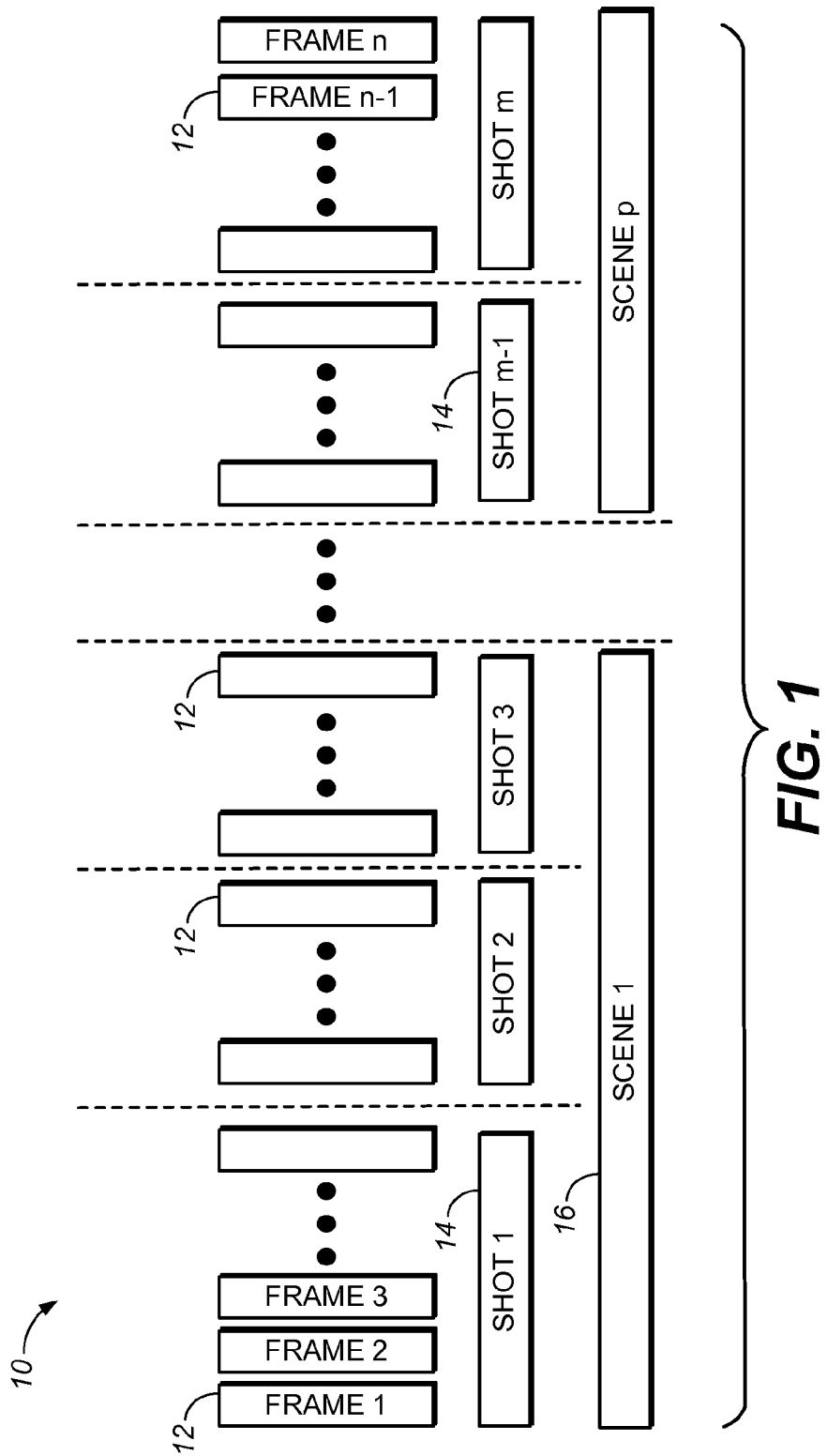
FIG. 1 is an example illustration of how video content typically comprises scenes, shots and frames.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Particular embodiments of the invention provide systems and methods for color grading video content. One aspect of the invention provides methods and systems for color grading video content which comprise: designating a component (e.g. a frame, a shot and/or a scene) of the video content to be a master component; designating one or more other components of the video content to be slave components, each slave component associated with the master component; performing a master component color grading operation to the master component; and, for each one of the slave components: performing the master component color grading operation to the slave component; and performing a slave color grading operation that is specific to the one of the slave components.

Designating a component of the video content to be a master component and designating one or more other components of the video content to be slave components may involve: identifying a plurality (or group) of associated components of the video content and selecting one component, from within the plurality of associated components, to be the master component and any other components, from within the plurality of associated components, to be the slave components.

Aspects of the invention also provide methods and systems and data structures for designating components (e.g. frames, shots and/or scenes) of video content to be master components or slave components associated with a particular master component.

Another aspect of the invention provides methods and systems for trim pass color grading video content which comprise: assigning an importance value or metric to each of a plurality of components (e.g. frames, shots and/or scenes) of the video content (which may occur while performing a first, initial color grading operation on the video content); selecting a subset of the plurality of components for grading during a second, trim pass color grading operation based at least in part on the importance value assigned to each of the plurality of components; and facilitating application of the second, trim pass color grading operations by a colorist only on the selected subset of the plurality of components. In some embodiments, one or more of the non-selected components can be automatically color graded based on the color grading of one or more selected components.

Other aspects of the invention comprise computer program products for color grading video content, the program product comprising a non-transitory computer-readable medium having executable code configured to cause a processor executing the code to perform any of the methods described herein.

Figure 2:
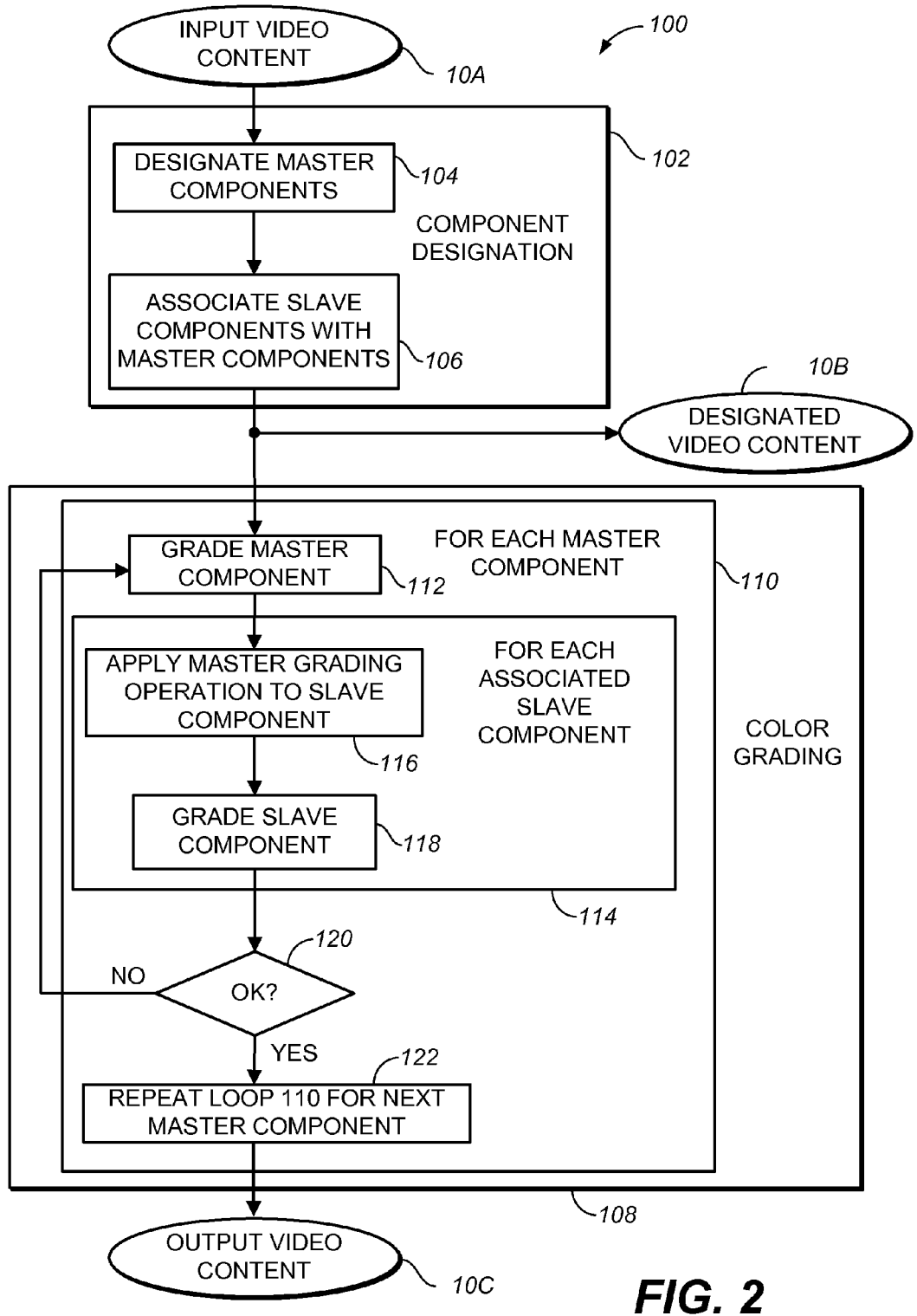
FIG. 2 is a block diagram illustrating a method for color grading video content according to a particular embodiment.

FIG. 2 is a block diagram illustrating a method 100 for color grading video content according to a particular embodiment. Method 100 may be involved in color grading video content 10 of FIG. 1, for example. As explained above, video content 10 may be broken down into frames 12, shots 14 and scenes 16. Method 100 involves designating one or more components of video content 10 to be master components and one or more other components of video content 10 to be slave components and then performing different processing steps on the master and slave components. In the context of this description and the accompanying claims, a component of video content may comprise a frame 12 (i.e. a single image) and/or a shot 14 (e.g. one or, more typically, a plurality of frames 12) and/or a scene 16 (e.g. one, or more typically, a plurality of shots 14). Typically, in the context of a particular color grading application, all of the components being graded are of the same type—i.e. all of the components being graded are shots 14, all of the components being graded are frames 12 or all of the components being graded are scenes 16, but this is not necessary and, in some applications, components being graded during a color grading operation may comprise a mixture of frames 12, shots 14 and/or scenes 16.

In the illustrated embodiment, method 100 receives input video content 10 in an input format 10A. Method 100 starts in component designation block 102. In general, component designation block 102 involves designating one or more particular components of video content 10 to be master components, designating other components of video content 10 to be slave components and associating slave components with corresponding master components. The block 102 component designation may be performed manually (e.g. by a colorist responsible for implementing the color grading of video content 10 using color suite software and/or the like), automatically (e.g. by computer or the like executing suitable software which may be a part of the color suite software) or via a combination of manual and automated techniques.

In the illustrated embodiment of method 100, the block 102 component designation comprises block 104 which involves designating one or more particular components of video content 10 to be master components. Components of video content 10 not designated to be master components in block 104 may be expressly designated, or merely assumed to be, slave components. The selection of master components in block 104 may be performed manually, automatically or via a combination of manual and automated techniques. Some techniques for automatically selecting a component for designation as a master component are described in more detail below.

After designating the components of video content 104 to be master or slave components, the block 102 component designation proceeds to block 106 which involves creating an association between slave components and master components. In particular embodiments, block 106 comprises associating each slave component with one or more corresponding master components. In other embodiments, block 106 involves associating each master component with one or more corresponding slave components. In particular embodiments, each slave component is associated with a corresponding on master component and each master component may be associated with one or more corresponding slave components. This is not necessary, however, and in general, as part of the block 106 association, slave components may be associated with one or more master components and master components may be associated with one or more slave components. The block 106 association can be recorded, or otherwise kept track of, using a variety of techniques discussed in more detail below.

Block 106 is the last functional block of component designation block 102. At the conclusion of component designation block 102, video content 10 has a format 10B where components of video content 10 have been designated as master components or slave components and associations have been created between master components and slave components. Different techniques for implementing the master and slave designation format 10B of video content 10 are discussed in more detail below.

Figure 3:
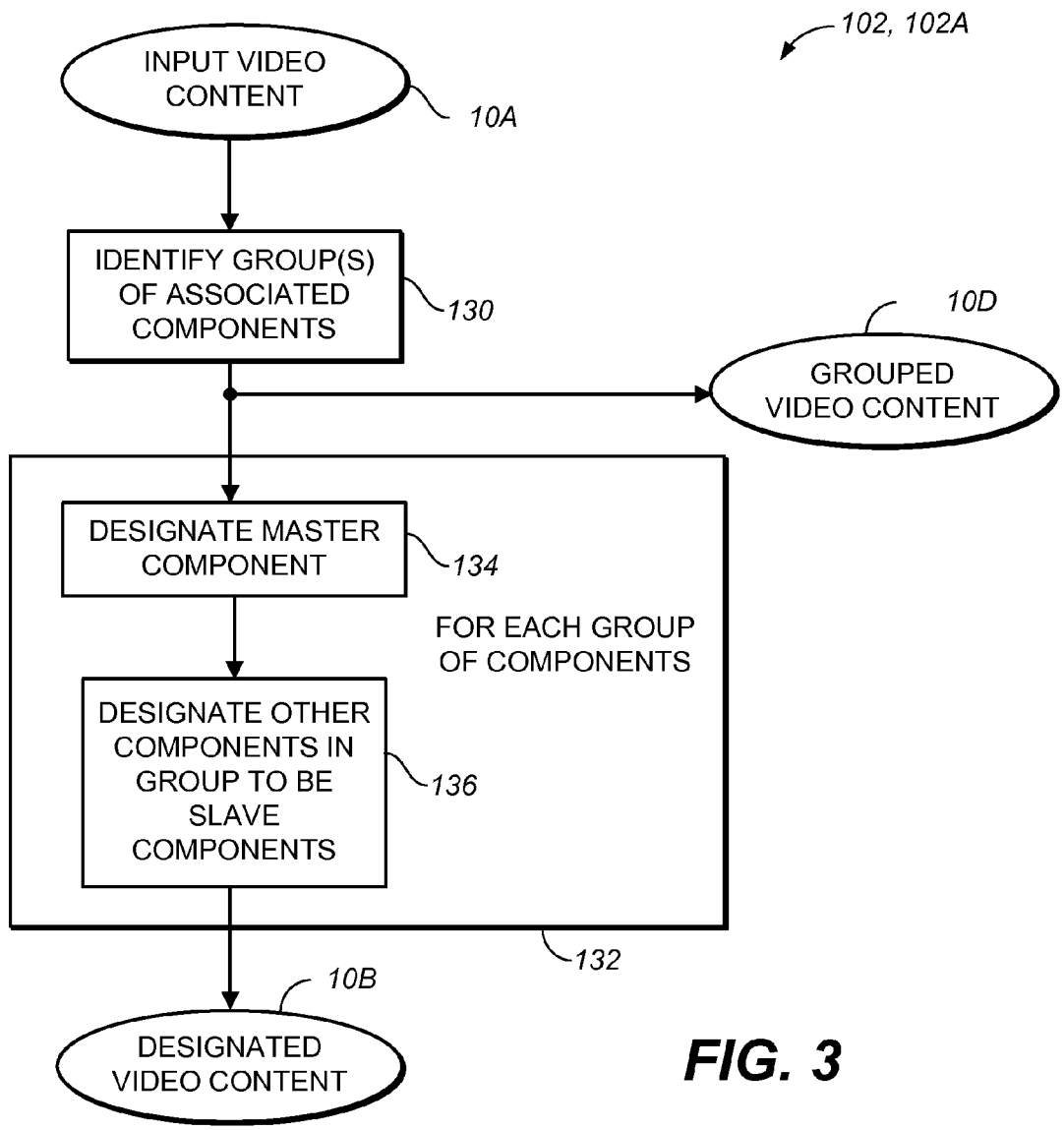
FIG. 3 is a block diagram representation of a method for implementing the component designation procedure of the FIG. 2 color shading method according to a particular embodiment.

As discussed above, component designation block 102 may be performed automatically. FIG. 3 is a block diagram representation of a method 102A for implementing component designation block 102 according to another particular embodiment. Method 102A is particularly suited for automated application, although this is not necessary and method 102A may be performed manually, automatically or via a combination of manual and automated techniques. Method 102A receives as input video content 10 in format 10A.

Method 102A commences in block 130 which involves identifying one or more groups (or pluralities) of associated components within video content 10. The block 130 group identification process involves identifying groups of components that are associated with, or otherwise related to, one another. Identifying associated components of video content 10 may be automated on the basis of metadata contained in video content 10. Such metadata may be recorded or otherwise acquired at the time of acquisition of the image/video data within video content 10 or during conform (e.g. during initial selection and/or assembly and/or arrangement of components that go into video content 10 from raw image/video data). Non-limiting examples of suitable acquisition metadata that can be used alone or in combination to identify groups of related components include: time of acquisition of the components; date of acquisition of the components; location of acquisition of the components; lens used for acquisition of the components; camera used for acquisition of the components; compass bearing associated with acquisition of the components; scene identifiers associated with acquisition of the components (e.g. associated with a script or storyboard) which identify particular components as belonging to a particular shot or scene; GPS readings; and/or the like.

In addition or in the alternative to using metadata, associated components may be identified in block 130 using image statistics or metrics which may be automatically determined by appropriate image processing. One non-limiting example of a suitable image statistic which may be used alone or in combination to identify groups of related video content components in block 130 is the histograms of the components of video content 10. For example, cumulative or average histograms of frames 12 in a shot 14 or scene 16 (in the case where the video content components are shots 14 or scenes 16) or individual histograms (in the case where the video content components are frames 12) could be compared against one another. Differences between such histograms (e.g. pairs of histograms) could be compared to a threshold to determine whether video content components corresponding to the histograms belong to the same group of related components. Other suitable image metrics which may be used along or in combination to identify groups of related components in block 130 comprise: signal to noise ratio of the components; average signal to noise ratios of the components; frequency band energies of the components; average frequency band energies of the components; and/or the like.

Another non-limiting example of a suitable image metric which may be used alone or in combination to identify groups of related components in block 130 involves the use of suitable video comparison and/or image comparison techniques to compare the components of video content 10. Such comparisons may be done on a frame-by-frame basis or on a pixel-by-pixel basis, for example. In cases where components of video content 10 comprise shots 14 or scenes 16 and the image comparison is performed on a pixel-by-pixel basis, the pixels in the frames 12 corresponding to a shot 14 or a scene 16 may be averaged prior to comparison, although this is not necessary. A similar example of a suitable image metric which may be used alone or in combination to identify groups of related components in some embodiments of block 130 involves the use of shot/scene detection algorithms which may detect changes between shots 14 and/or scenes 16. Those skilled in the art will appreciate that there is a large and growing variety of known techniques for comparing components of video content 10 to one another and/or for detection of changes between shots 14 and/or scenes 16. Many of these techniques are suitable for use in block 130. Such techniques can be used to generate a metric or score indicative of the proximity of video content components (e.g. pairs of components) to one another and/or indicative of the likelihood of a change between shots 14 and/or scenes 16. Such metrics could be compared to one or more thresholds to determine whether video content components belong to the same group of related components or to various levels of related components.

Other image statistics that could be used alone or in combination to identify groups of related components in block 130 include: the dynamic ranges (or average dynamic ranges) of components, the color gamuts (or average color gamuts) of components and/or the like.

Another piece of information which may be used alone or in combination to identify groups of related components in block 130 is the temporal proximity of components to one another in the time sequence of video content 10—for example, components that are temporally close to one another in the timeline of video content 10 may be grouped together and components that are temporally distant from one another in the timeline of video content 10 may not be grouped. Such temporal proximity information may be stored as metadata in video content 10 or may otherwise be determined from analysis of video content 10.

Those skilled in the art will appreciate that there are other techniques that could be used alone or in combination with any of the techniques disclosed herein to identify one or more groups of associated components in block 130. It will also be appreciated that the identification of groups in block 130 may be performed manually (e.g. by a colorist responsible for implementing the color grading of video content 10 using color suite software and/or the like), automatically (e.g. by computer or the like executing suitable software which may be a part of the color suite software) or via a combination of manual and automated techniques.

At the conclusion of block 130 one or more groups (or pluralities) of associated video content components are determined in video content 10. Video content 10 output from block 130 has a format 10D, where one or more groups of associated components are designated within video content 10. Different techniques for implementing format 10D of video content 10 which recognizes the block 130 groups are discussed in more detail below.

At the conclusion of block 130 method 102A proceeds to block 132 which is a loop performed once for each block 130 group of associated video content components. Each iteration of block 132 involves: designating a master component from within the current group (block 134); and designating the other components from within the current group to be slave components (block 136). By way of non-limiting example, the designation of a master component in block 134 may be determined based on one or more of: the length of the associated components within the group (e.g. a shot 14 with the most frames 12 from among a group of associated shots 14 may be selected to be a master component); a location of the component in a timeline of video content 10 (e.g. a first or last or middle temporal component in a timeline of a group may be selected to be a master component); a video or image comparison proximity of components within the group (e.g. a video or image comparison technique could be used to identify the component that is most proximate to the other components in the group and the most proximate component may be selected to be the master component); the time spent by a director (e.g. one person or several people) working with the components; a manual selection process; and/or the like.

After a master component is designated in block 134, block 136 involves designating the other components in the current group to be slave components. Components of video content 10 not designated to be master components in block 134 may be expressly designated, or merely assumed to be, slave components.

After iteration of block 132 for each of the block 130 groups, video content 10 has a format 10B where components of video content 10 have been associated into groups of associated components, and where each group of associated components comprises a master component and one or more slave components.

Format 10B of video content 10 (designated video content 10B) may make use of metadata to: identify each video content component; track the designation of each video content component as a master component, a slave component; and/or identify the group of associated components to which each video content component belongs. There are a variety of different schemes which can be envisaged wherein metadata could be used to track suitable information. The particular metadata scheme for designated video content 10B may depend on the particular implementation of component designation block 102.

Figure 4A:
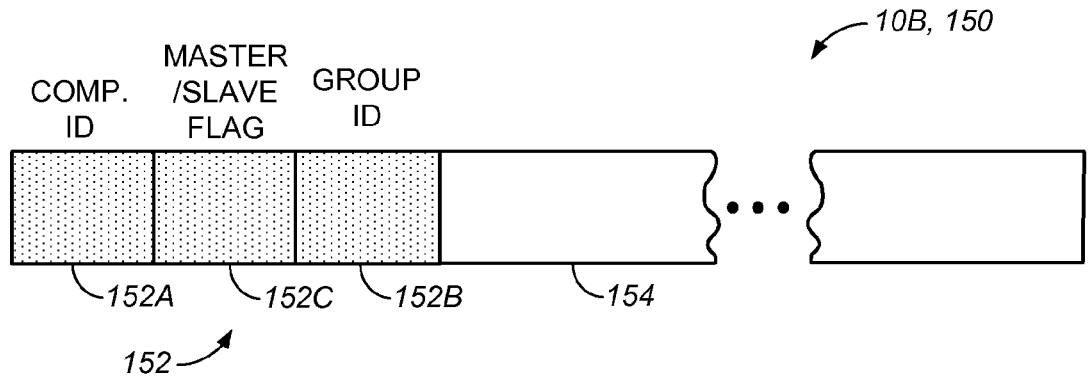
FIGS. 4A-4C show a number of example metadata schemes for implementation of designated video content generated in accordance with the methods of FIGS. 2 and 3.
Figure 4B:
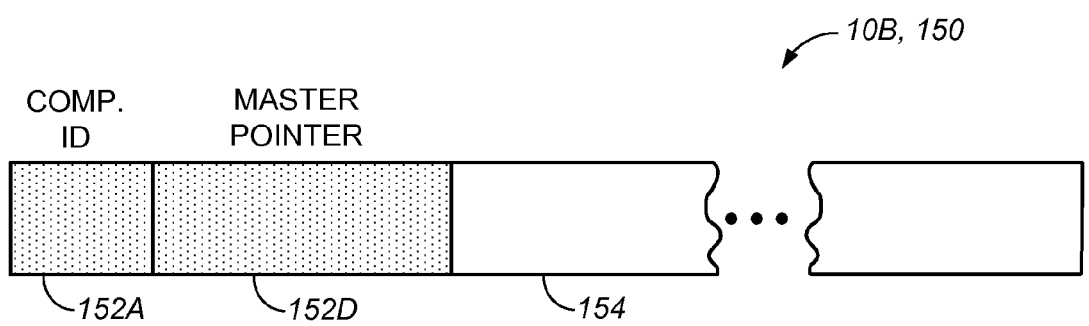
Figure 4C:
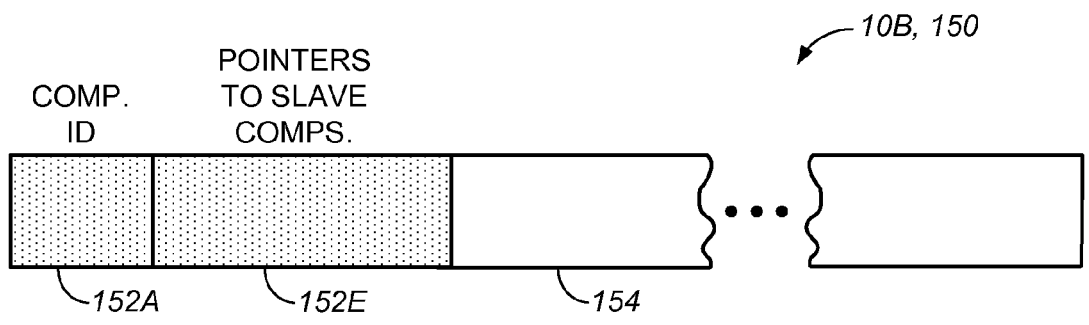

A number of example metadata schemes for implementation of designated video content 10B are presented in FIGS. 4A-4C, but it will be appreciated that these metadata schemes are exemplary in nature and are not meant to be limiting. FIGS. 4A-4C each show an exemplary video content component 150 from within designated video content 10B. In each of the embodiments shown in FIGS. 4A-4C, designated video content component 150 comprises a metadata portion 152 which comprises the metadata associated with the block 102 designation of master and slave components and a bulk portion 154 which contains the video/image data associated with video content 10B and which may contain other metadata not expressly related to the block 102 designation of master and slave components.

FIG. 4A shows an example component 150 which is suitable for use with the block 102 designation method 102A (FIG. 3). Metadata fields 152 of the FIG. 4A component 150 include: a component ID field 152A which is a unique identifier particular to component 150; a group ID field 152B which is an identifier which identifies component 150 as belonging to a particular group of associated components (e.g. a group determined in block 130 (FIG. 3)); and a master/slave flag 152C which identifies component 150 as being the master of its group or a slave of its group. It will be appreciated that since metadata fields 152 of the FIG. 4A example component 150 include group ID field 152B, the FIG. 4A embodiment is also suitable for use as a metadata format 10D for video content 10 output from the block 130 group identification procedure.

FIG. 4B shows an example component 150 having metadata fields 152 which include: a component ID field 152A which is a unique identifier particular to component 150; and a master pointer field 152D which points to the component ID of the master component with which the FIG. 4B component 150 is associated. In cases where the FIG. 4B component 150 is itself designated as a master component, master pointer field 152D may be self-referential. Component 150 of the FIG. 4B embodiment could be modified to include a group ID field similar to group ID field 152B and/or a master/slave flag 152C similar to those of the FIG. 4A component.

FIG. 4C shows an example component 150 having metadata fields 152 which include: a component ID field 152A which is a unique identifier particular to component 150; and a field 152E which points to the component IDs of all of the slave components that are associated with the particular example component 150. In cases where the FIG. 4C component is itself designated as a slave component, slave pointer field 152E may be empty. Component 150 of the FIG. 4C embodiment could be modified to include a group ID field similar to group ID field 152B and/or a master/slave flag 152C similar to those of the FIG. 4A component.

Returning now to method 100 of FIG. 2, after generating designated video content 10B, method 100 proceeds to block 108 which involves color grading designated video content 10B to obtain color graded output video content 10C. In accordance with the block 108 color grading technique, the color grade manipulations of a master component (referred to as master grading operations) are applied to the master component and also to all of the slave components associated with the master component—i.e. master grading operations are global to the master component and its associated slave components. In addition to being subjected to their associated master grading operations, the block 108 color grading methodology also permits slave components to be independently graded via independent slave grading operations. Such slave grading operations may include masking operations, power window operations and/or the like which are specific to a particular component. Such slave grading operations are not transferred to other components.

The block 108 color grading method is now described in more detail. The block 108 color grading procedure starts with a loop 110 that iterates once for each master component in designated video content 10B. Loop 100 commences in block 112 which involves grading the current master component. The block 112 master grading is typically performed by a human colorist using suitable color suite software and/or the like to achieve a desired color effect as described above. While block 112 master grading may be referred to herein as a master grading operation, the block 112 master grading operation may (and typically does) involve a plurality of component grading operations.

From block 112, the block 108 color grading method proceeds to another loop 114 that iterates once for each slave component associated with the current master component. Loop 114 commences in block 116 where the block 112 master grading operation is applied to the current slave component. The application of the block 112 master grading operation to the current slave component in block 116 may be done automatically—e.g. by a computer or the like which implements the color suite on which the block 108 color grading is being performed. After automatic application of the master grading operation in block 116, loop 114 proceeds to block 118 where any component-specific grading operations (slave grading operations) are applied to the current slave component. The block 118 slave grading operations are typically performed by a human colorist using the color suite software and/or the like. In some instances, it may not be necessary or desirable to perform any slave grading operations in block 118. In some instances it may be desirable to perform a number of slave grading operations in block 118. While not expressly shown in FIG. 2, in some embodiments, loop 114 may permit a component-specific grading operation to be performed on the current master component. Such a component-specific grading operation would not be transferred to the associated slave components and is applied to the current master component only.

Loop 114 is exited after looping though all of the slave components associated with the current master component and the block 108 color grading method returns to loop 110 and more particularly to block 120 which involves inquiring as to whether the colorist is satisfied with the color grading of the current group of associated components (i.e. the current master component and its associated slave components). If the colorist is not satisfied with the color grading of the current master component and its associated slave components (block 120 NO branch), then the procedure loops back to block 112 and repeats the procedures of loop 110 without incrementing the current master component.

If, on the other hand, the colorist is satisfied (block 120 YES branch), then the procedure advances to block 122 where the master component is incremented and loop 110 is performed for the next master component (and its associated slave components) until all of the master components are exhausted. When all of the master components are exhausted, the block 108 color grading method exits loop 110 with output video content 10C.

The block 108 color grading methodology advantageously permits changes to be made across associated groups of components (e.g. a master component and its associated slave components) via master grading operations without the loss of ability to perform slave grading operations which are component-specific. Consider an example where a group of associated components in a scene are desired (for a particular creative intent) to be graded such that each successive component is more saturated than the last. This grading could be accomplished for example, by component-specific slave grading operations. Then consider that there is a desire to make a further change to all of the shots in the group of associated components. Since all of the components in the group had to be separately graded to achieve the desired saturation, such a further change would typically require separate re-grading for each component. With the master/slave grading scheme of block 108, the further change could be implemented once as a master grading operation and applied to all of the associated components in the group.

While not expressly shown in the illustrated embodiment, method 100 may optionally be modified to provide a global color grading operation which is applied to all components in video content 10. Such a global color grading operation may be referred to as a "first light" grade. Such a global color grading operation would typically be performed by a human colorist using the color suite software and/or the like. Because such a global color grading operation is performed on all components of video content 10, it could be inserted anywhere in method 100.

Figure 8:
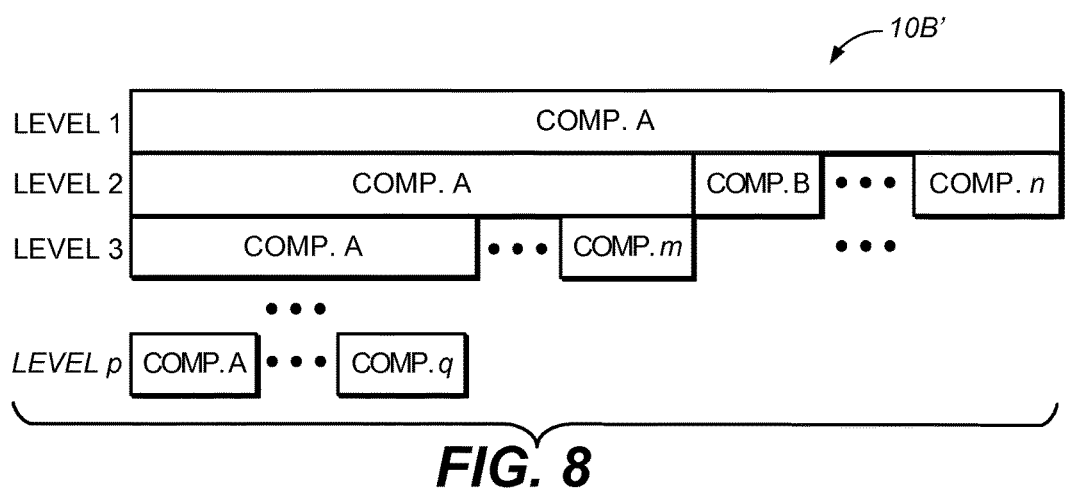
FIG. 8 is a schematic depiction of video content which has been designated according to a hierarchical master/slave designation in accordance with an exemplary embodiment.

In some embodiments, it may be desirable to designate multiple (e.g. hierarchical) levels of master/slave relationships between components of video content 10. FIG. 8 is a schematic depiction of video content 10B' which has been designated according to a hierarchical master/slave designation in accordance with an exemplary embodiment. Designated video content 10B' has a p levels of master and slave designations. In the notation used in the example case of FIG. 8, the levels of master/slave designates are labelled LEVEL 1, LEVEL 2, LEVEL 3, . . . LEVELp, with LEVEL 1 representing the highest designation for video content 10B' and LEVEL p representing the lowest designation for video content 10B'. In the example case of the illustrated embodiment, video content 10B' has one LEVEL 1 master component (LEVEL 1, COMPONENT A) which is a master component to all of the other components—i.e. all of the other components of video content 10B' are slaves to LEVEL 1, COMPONENT A. This configuration is not necessary. In other situations, video content may be designated with a plurality of LEVEL 1 (or highest level) components.

Video content 10B' of the exemplary embodiment shown in FIG. 8 includes n LEVEL 2 components. The LEVEL 2 components have a slave designation with respect to LEVEL 1, COMPONENT A, but are also masters to respective ones of the components at LEVEL 3 though LEVEL p. For example, in the case of the illustrated example embodiment, LEVEL 2, COMPONENT A is a master component to LEVEL 3, COMPONENT A through LEVEL3, COMPONENT m and to LEVEL p, COMPONENT A through LEVELp, COMPONENT q. LEVEL 2, COMPONENT A may also be a master component to a number of components in LEVEL 4 through to LEVEL p−1, although such components are not explicitly shown in the FIG. 8 illustration. Similarly, in the case of the FIG. 8 example embodiment, LEVEL 3, COMPONENT A is a slave component to LEVEL 1, COMPONENT A and to LEVEL 2, COMPONENT A, but is also a master to respective ones of the components at LEVEL 4 through LEVEL p.

In the illustrated example embodiment shown in FIG. 8, components of a particular level are shown as having only one master component at any higher levels. For example, LEVEL 3, COMPONENT A through LEVEL 3, COMPONENT m are shown as having one LEVEL 2 master component (LEVEL 2, COMPONENT A) and one LEVEL 1 master component (LEVEL 1, COMPONENT A). This is not strictly necessary. In some embodiments, components of a particular level may have a plurality of master components at higher levels. For example, a LEVEL 3 component might have a plurality of LEVEL 2 masters or LEVEL 1 masters and so on.

In embodiments which incorporate hierarchical master/slave designations of the type shown in FIG. 8, method 100 may be modified in block 102 to permit the designation of multiple levels of master/slave designations. For example, block 104 of FIG. 1 may be modified to involve designation of multiple levels of master components and slave components and block 106 may be modified to involve association of multiple levels of master and slave components with one another.

Where the block 102 component designation is performed in accordance with method 102A of FIG. 3, the block 130 process of identifying groups of related components may be performed in substantially the same manner described herein. Groups of components identified in block 130 to be in the same group may be linked under a common group master component. In some embodiments, the block 130 group identification process may be modified to provide hierarchies of groups. For example, multiple thresholds and/or rankings may be used when comparing metadata and/or image metrics and/or temporal proximity to create multiple levels of groups. The procedures of the block 132 loop may be modified to permit the designation of multiple levels of master slave designations. For example, blocks 134 and 136 of FIG. 3 may be modified to involve designation of multiple levels of master and slave components. The designation of multiple levels of master components in block 134 may involve similar processes to, and may be based on data similar to, those described herein. In some embodiments, block 134 may involve using multiple thresholds and/or rankings in the comparison of the data used to determine the multiple levels of master components.

In embodiments which incorporate hierarchical master/slave designations of the type shown in FIG. 8, method 100 may be modified in block 108 to provide a nested looping procedure. More particularly, the block 110 loop which iterates for each master component could be modified so as to iterate first for each LEVEL 1 master component and then for each LEVEL 2 master component and so on. It will be appreciated that the exact nature of the nesting of such loops may be based on the rules associated with hierarchical structure of the master/slave designations. For example, in the case of the illustrated embodiment of FIG. 8, components of a particular level have only one master component at any higher levels. In such cases, it is possible to nest the LEVEL 2, LEVEL 3 ... LEVEL p loops inside each LEVEL 1 iteration. In other embodiments, where components of a particular level have a plurality of master components at higher levels, it might be desirable to iterate through all of the LEVEL 1 components before proceeding to the LEVEL 2 components and so on.

In embodiments which incorporate hierarchical master/slave designations of the type shown in FIG. 8, the exemplary metadata schemes shown in FIGS. 4A-4C may be modified to permit the designation of multiple levels of master/slave relationships. In the case of the example component of FIG. 4A, metadata field 152C could be modified to provide an indicator of the FIG. 8 designation level rather than a mere master/slave flag. For example, metadata field 152C could indicate: LEVEL 1, LEVEL 2 ... and so on. In the case of the example component of FIG. 4B, metadata field 152D could be used to refer to multiple master components at different levels (although metadata field 152D could also point to multiple master components in embodiments where video content 10 has only a single tier of master/slave designations). The example component of FIG. 4C could be used in the format shown to accommodate the hierarchical master/slave designation shown in FIG. 8.

Figure 5:
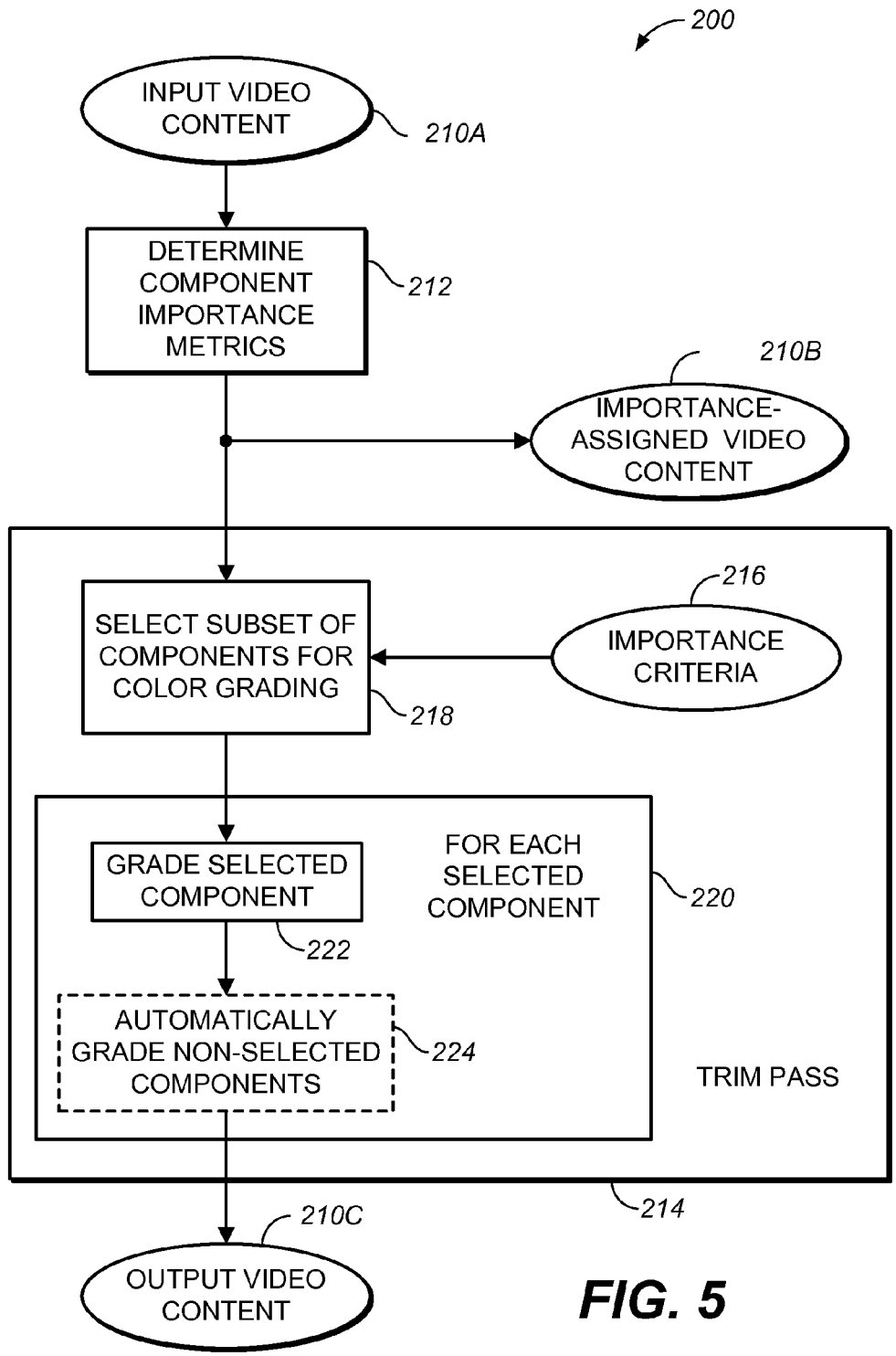
FIG. 5 is a flow chart diagram of a method for effecting a trim pass color grade according to a particular embodiment.

FIG. 5 is a flow chart diagram of a method 200 for effecting a trim pass color grading operation according to a particular embodiment. In the illustrated embodiment, trim pass method 200 receives input video content in an input format 210A. Formats 210A, 210B and 210C are collectively and individually referred to as video content 210 herein. As discussed above, a trim pass is a color grading operation typically used to manipulate video content 210A for display using different rendering or display devices or for different delivery pipelines. As such, the creative intent has usually already been introduced to the video content 210A in an initial color grading (not shown) performed prior to performing the method 200 trim pass. In such an initial color grading, input video content 210A may have been graded for one particular type of rendering device. In such an initial color grading, input video content 210A may have been subjected to the master/slave designation described herein, but that is not necessary.

Method 200 starts in block 212 which involves determining a component importance metric for one or more components of video content 210A. In the description that follows, it will be assumed, for ease of discussion, that block 212 involves determining an importance metric for every component of video content 210A; however, it will be appreciated that, in general, block 212 may involve determining an importance metric for any one or more components (e.g. a subset of the components) of video content 210A. In some embodiments, the block 212 determination of importance metrics for particular components may take place during (or temporally proximate to) the initial grading.

A block 212 component importance metric could be added to video content 210A as a metadata field (e.g. a component importance field). For example, where method 200 is practiced on video content 210A which has also been subjected to the master/slave designation described herein, such a component importance field may be added to any of the video content components 150 of FIGS. 4A-4C. However, method 200 does not require that video content 210A be subjected to the master/slave designation described herein. In some embodiments, a component importance field may be added as the only color grading-related metadata field to any component of video content 210A.

The block 212 determination of an importance metric for a particular component may make use of a variety of input data. In one particular embodiment, determining an importance metric for a particular component in block 212 is based on, and may be positively correlated with, an amount of time spent performing the initial color grade on the component. That is, if a long time is spent grading a particular component of video content 210A during its initial color grading, then block 212 involves assigning the particular component a relatively high importance metric value. Conversely, if relatively little time is spent grading a particular component of video content 210A during its initial color grading, then block 212 involves assigning the particular component a relatively low importance metric value. A similar basis for the importance metrics of components determined in block 212, which may be used in addition or in the alternative to the time spent performing the initial grade on particular components, is the number of views of a particular component during the initial grading. If a particular component of video content 210A is viewed frequently when performing the initial grade, then it may be assigned a relatively high importance metric value in block 212 and if a particular component of video content 210A is viewed relatively infrequently or is not viewed at all when performing the initial grade, then it may be assigned a relatively low importance metric value in block 212.

Additionally or alternatively, the block 212 determination of an importance metric for a particular component may be based on, and positively correlated with, a number of color grading changes made to the particular component during its initial color grading. That is, if a large number of changes are used when grading a particular component of video content 210A during its initial color grading, then block 212 involves assigning the particular component a relatively high importance metric value. Conversely, if relatively small number of changes are made while grading a particular component of video content 210A during its initial color grading, then block 212 involves assigning the particular component a relatively low importance metric value. Further, in some embodiments, different weights may be used to assign relative importance to different types of color grading changes, so that it is not merely the total number of changes made that is used as the basis for determining the importance metric of a shot, but it may comprise the weighted combination (e.g. sum) of the importance of certain types of changes. By way of non-limiting example, color grading changes which involve the use of secondaries (e.g. color grading changes that are more than mere manipulation of the red, blue and/or green color channels), color windows, masks and/or the like may be assigned relatively high weights and color grading changes that involve the manipulation of primaries (e.g. red, blue and/or green color channels) or other common grading variables (e.g. contrast or brightness) may be assigned relatively low weights.

Additionally or alternatively, the block 212 determination of an importance metric may be based on input from a user, such as, by way of non-limiting example, the colorist performing the initial color grading. For example, a colorist performing the initial color grading may be of the view that a particular component is of relatively high importance and such a component may be assigned a relatively high importance metric value in block 212. Conversely, the colorist may be of the view that a particular component is of relatively low importance and such a component may be assigned a relatively low importance metric value in block 212.

Additionally or alternatively, the block 212 determination of an importance metric may be based on whether a particular component is designated (e.g. in method 100 or in some other method) to be a master component or a slave component—e.g. master components could be assigned relatively high importance in block 212 and slave components could be assigned relatively low importance in block 212. Similarly, where a hierarchical designation scheme is used, LEVEL 1 components could be assigned the highest importance, LEVEL 2 components could be assigned the next highest importance and so on. Even, in embodiments, where the master/slave designation is not used as a basis for the block 212 determination, it is expected that that there would be a strong positive correlation between master shots and the block 212 importance metric value, although this is not necessary and there could be slave components with relatively high block 212 importance metric values.

In embodiments where the components of video content 210 are shots 14 (see FIG. 1), block 212 may optionally involve determining one frame 12 within each shot 14 to be the representative frame 12 of that shot 14. This optional aspect of block 212 may involve attributing an importance metric as metadata to each frame 12 and then selecting the frame 12 with the highest importance metric to be the representative frame 12 for its corresponding shot 14. Such importance metric metadata and a flag indicative of whether a frame 12 is a representative frame 12 for its corresponding shot 14 could be added to frame 12 in a manner similar to that discussed above. In some embodiments, the selection of a particular frame 12 to be a representative frame 12 for a shot 14 may be based on the number of times that the frame 12 is viewed by the colorist when the colorist is performing the initial grading operation on the shot 14 and/or any other suitable criteria described herein. As discussed above, a view count (or any other importance metric) could be recorded as importance metric metadata added to frames 12.

In addition or in the alternative to associating shot importance metadata with each frame 12, in embodiments where the components of video content 210 are shots 14, metadata could additionally or alternatively be associated with each shot 14 and such metadata could point to, or otherwise indicate, a particular frame 12 to be the representative frame 12 for that shot 14. Such metadata, which is associated with shots 14, could include a table, matrix array or the like which records the importance metric metadata for a number (e.g. one or more) of the most important frames 12 for each shot 14 and the representative frame 12 could be determined on the basis of a comparison of this importance metric metadata. For example, in the case where the importance metric metadata is based on number of views of frames 12, the table associated with a particular shot 14 could keep track of the number of views of each frame 12 (or a subset of the frames 12) in the shot 14 and select the representative frame 12 on that basis.

In embodiments where the components of video content 210 are scenes 16 (see FIG. 1), block 212 may optionally involve determining one frame 12 (and/or one shot 14) within each scene 16 to be the representative frame 12 (and/or shot 14) of that scene 16. In a manner analogous to that described above for the case where the components are shots 14, where the components are scenes 16, this optional aspect of block 212 may involve attributing an importance metric as metadata to each frame 12 (and/or shot 14) and then selecting the frame 12 (and/or shot 14) with the highest importance metric to be the representative frame 12 (and/or shot 14) for its corresponding scene 16. Such importance metrics could be determined using any of the techniques described herein. In addition or in the alternative to associating shot importance metadata with each frame 12 (and/or shot 14), in embodiments where the components of video content 210 are scenes 16, metadata could additionally or alternatively be associated with each scene 16 and such metadata could point to, or otherwise indicate, a particular frame 12 (and/or shot 14) to be the representative frame 12 (and/or shot 14) for that scene 16.

After block 212, video content 210 has a format 210B where components of video content 10 have been assigned importance metrics (importance-assigned video content 210B). Method 200 proceeds to block 214 which involves performing a trim pass 214 on importance-assigned video content 210B to obtain trim-passed video content 210C. In accordance with the block 214 trim pass technique, a subset of the components of importance-assigned video content 210B may be subjected to the trim pass color grading procedures. The particular subset of the importance-assigned video content 210B that may be subjected to the trim pass color grading procedures may be selected based on the block 212 importance metrics assigned to the components of video content 210B. Advantageously, the block 214 trim pass methodology permits a colorist to perform trim pass operations on the most important components of importance-assigned video content 210B and thus spend a relatively small amount of time to achieve an acceptable trim pass quality. This can help to achieve efficiency when performing trim pass operations, particularly, although not only, in circumstances where the colorist performing the trim pass color grading operations is not the same as the colorist performing the initial color grading.

The block 214 trim pass method is now described in more detail. The block 214 trim pass procedure starts in block 218 by determining a subset of the components of importance-assigned video content 210B to subject to color grading procedures. The block 218 subset of components may be determined on the basis of the importance metric values assigned to the components of video content 210B during block 212 and one or more importance criteria 216. Importance criteria 216 may be user-configured (e.g. configured by a colorist who my base importance criteria 216 on a color grading budget). In some embodiments, importance criteria 216 may comprise a threshold importance value and block 218 may involve subjecting importance-assigned video content 20B to a thresholding process. For example, the block 218 subset may be determined to be all components of importance-assigned video content 210B having importance metrics with values greater than the importance criteria threshold 216. In other embodiments, importance criteria 216 may additionally or alternatively comprise a threshold percentage x (and/or threshold number y) of components of importance-assigned video content 210B and block 218 may involve determining the subset to be the x percent (or y number) of components of importance-assigned video content 210B with the highest importance metric values. In other embodiments, the block 218 selection of a subset of components may additionally or alternatively involve selecting the representative components (e.g. representative frames 12 and/or representative shots 14) which are associated with other larger components (e.g. shots 14 or scenes 16) as discussed above.

After selecting a subset of the components of importance-assigned video content 210B to be graded, the block 214 trim pass method enters a loop 220 which iterates once for each component selected in block 218. Loop 220 starts in block 222 which involves performing a trim pass color grade operation on the current selected component. The block 222 trim pass color grading operations are typically performed by a human colorist using color suite software and/or the like.

Once the selected component is graded in block 222, then method 200 proceeds to optional block 224. Optional block 224 involves automatically grading one or more non-selected components. The block 224 automatic grading of one or more non-selected components may be based on the block 222 grading of the currently selected component and/or the block 222 grading of any previously graded selected component(s). For example, the grading automatically applied to non-selected components in block 224 may comprise the same grading applied to the currently selected component in block 222 or some function of the grading applied to the currently selected component in block 222. As another example, the grading automatically applied to non-selected components in block 224 may comprise some function (e.g. a weighted average or the like) of the grading applied to the currently selected component in block 222 and the grading (s) applied to previously selected component(s) in block 222.

Although not explicitly shown, in some embodiments, block 224 involves choosing one or more particular non-selected components to automatically grade. The block 224 choice of one or more particular non-selected components to automatically grade may be based on any of a number of suitable criteria. The block 224 choice of one or more particular non-selected components for automatic grading may be based on the master/slave designations described herein. For example, if a master component is the currently selected component (or a past selected component) graded in block 222, then block 224 may involve choosing (and then automatically grading) its corresponding slave components. For example, slave components may be chosen and automatically graded in block 224 using the same grading operations as used in block 222 for their corresponding master component.

As another example, the block 224 choice of one or more particular components to automatically grade may additionally or alternatively involve using associations between groups of components—e.g. groups of associated components determined in block 130 or in a procedure (not shown) of method 200 analogous to block 130 or in a sub-procedure (not shown) of block 224 analogous to block 130. Creating associations between groups of components may involve techniques similar to any of those described above for block 130 and block 224 may involve applying common trim pass color grading operations to components belonging to the same group. If any component in a group of associated components is the currently selected component (or a past selected component) graded in block 222, then block 224 may involve choosing (and then automatically grading) other member component(s) of the group. For example, non-selected group members may be graded in block 224 using the same grading operations as used in block 222 for selected member(s) of their group.

As still another example, the block 224 choice of one or more particular components to automatically grade may additionally or alternatively involve using the representative frames 12 and/or shots 14 determined in block 212. For example, where a frame 12 or shot 14 is the currently selected component graded in block 222 and is a representative frame 12 or shot 14 for a particular shot 14 or scene 16, then block 224 may involve choosing (and then automatically grading) other member component(s) of the particular shot 14 or scene 16 for which the currently selected component is representative.

In some embodiments, block 224 may involve applying trim pass grading operations to non-selected components (or to chosen non-selected components) based on the block 222 grading operations performed to a corresponding selected component. In some embodiments, block 224 may involve applying trim pass grading operations to non-selected components (or to chosen non-selected components) based on a combination (e.g. an interpolation or average) of a plurality of block 222 grading operations performed on a corresponding plurality of selected components.

Block 224 is optional. In some embodiments, it is not necessary to perform the trim pass operations on the non-selected components of importance-assigned image data 210B and sufficient trim pass quality is achieved by performing the block 222 trim pass operations on the selected components.

Figure 6:
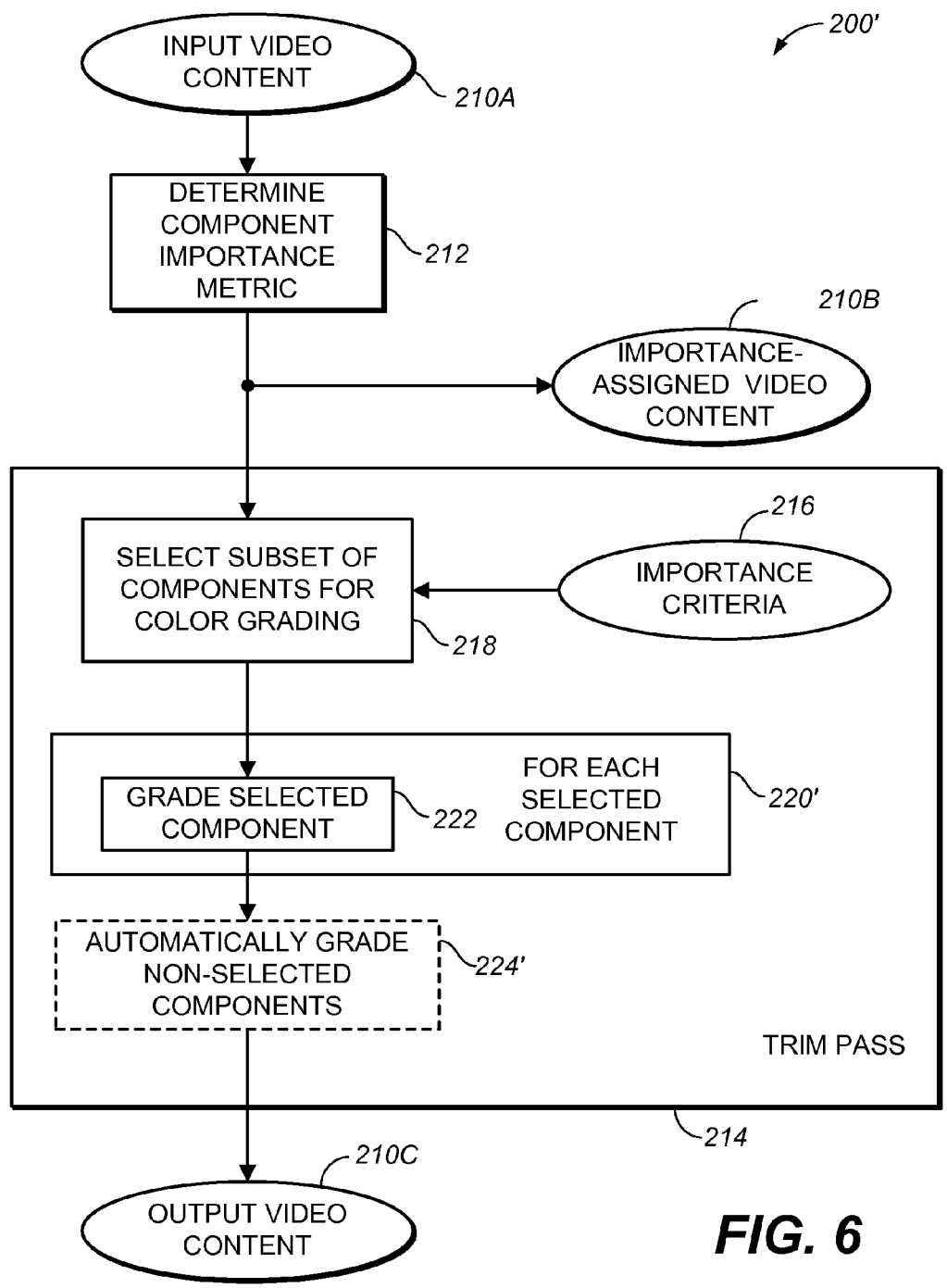
FIG. 6 is a flow chart diagram of a method for effecting a trim pass color grade according to another particular embodiment.

FIG. 6 is a flow chart diagram of a method 200' for effecting a trim pass color grade according to a particular embodiment. Method 200' of FIG. 6 is similar to method 200 of FIG. 5, except that loop 220' only involves grading selected components in block 222 and the optional grading of non-selected components (or chosen non-selected components) is performed in block 224' after the conclusion of loop 220'. In other respects, method 200' is similar to method 200.

Figure 7:
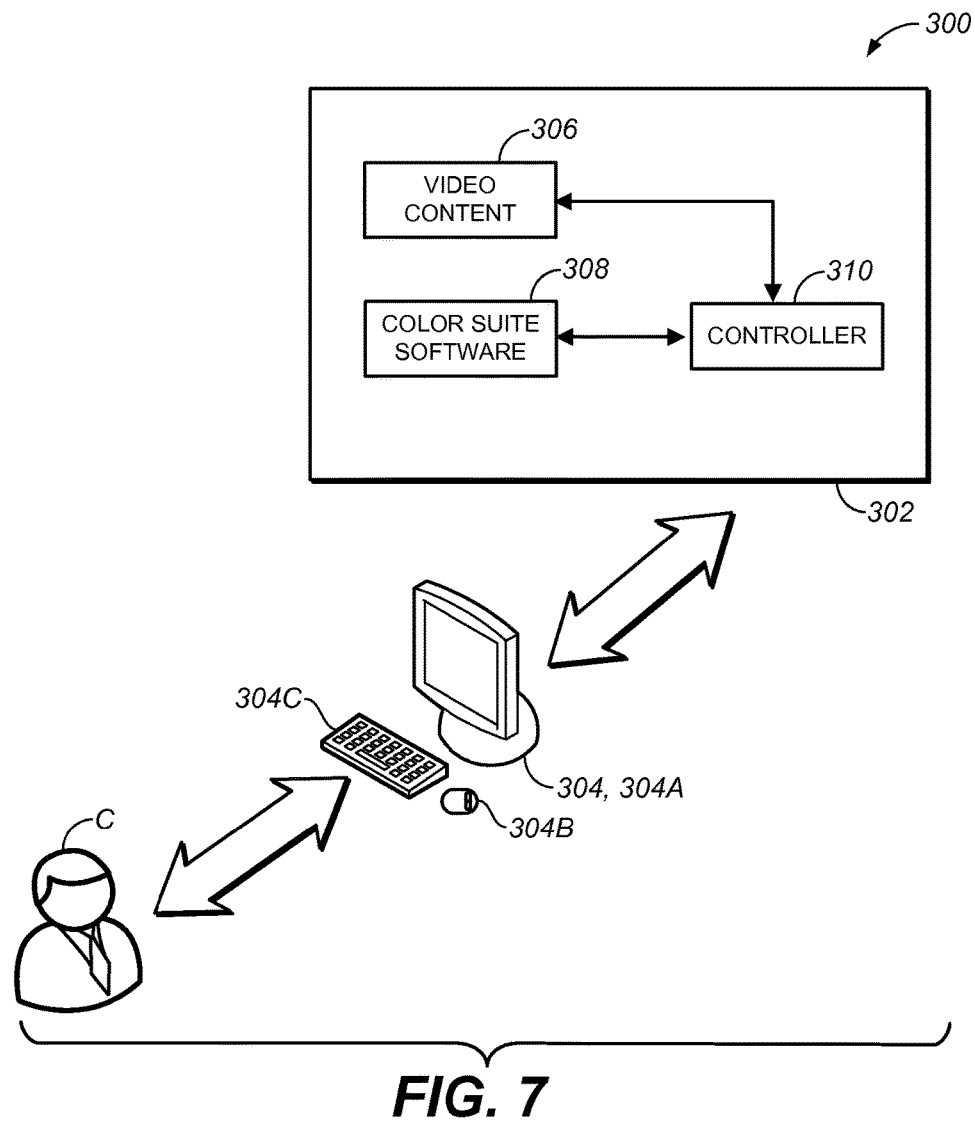
FIG. 7 is a schematic block diagram of a system for color grading video content according to a particular embodiment.

FIG. 7 is a schematic block diagram of a system 300 for color grading video content 306 according to a particular embodiment. A colorist C interacts with system 300 via a user interface 304. In the illustrated embodiment, user interface 304 is shown comprising a display 304A, a mouse 304B and a keyboard 304C, although, as is well known in the art, user interface 304 may comprise a variety of other components. System 300 comprises a controller 310 which executes software 308. Software 308 (which may comprise color suite software or the like, when executed by controller 310 may cause controller 310 (together with colorist C) to implement portions of (or all of) the methods described herein. Software 308 may be embodied as a computer program product on a non-transitory medium.

Controller 310 and component thereof may comprise hardware, software, firmware or any combination thereof. For example, controller 310 may be implemented on a programmed computer system 302 comprising one or more processors, user input apparatus, displays and the like. Processors may comprise microprocessors, digital signal processors, graphics processors, field programmable gate arrays, and/or the like. Components of controller 310 may be combined or subdivided, and components of controller 310 may comprise sub-components shared with other components of controller 310. Components of system 300, including components of controller 310, may be physically remote from one another. For example, controller 310 may be instantiated in a programmed server computer which communicates with display 304A and user interface 304 via the Internet or another network.

Where a component is referred to above (e.g., a display, controller, user interface, etc.), unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Where the context permits, words in the above description using the singular or plural number may also include the plural or singular number respectively. The word "or," in reference to a list of two or more items, covers all of the following interpretations of the word: any of the items in the list, all of the items in the list, and any combination of the items in the list.

The above detailed description of example embodiments is not intended to be exhaustive or to limit this disclosure and claims to the precise forms disclosed above. While specific examples of, and examples for, embodiments are described above for illustrative purposes, various equivalent modifications are possible within the scope of the technology, as those skilled in the relevant art will recognize.

These and other changes can be made to the system in light of the above description. While the above description describes certain examples of the technology, and describes the best mode contemplated, no matter how detailed the above appears in text, the technology can be practiced in many ways. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above description section explicitly and restrictively defines such terms. Accordingly, the actual scope of the technology encompasses not only the disclosed examples, but also all equivalent ways of practicing or implementing the technology which may be claimed.

From the foregoing, it will be appreciated that specific examples of apparatus and methods have been described herein for purposes of illustration, but that various modifications, alterations, additions and permutations may be made without departing from the practice of the invention. The embodiments described herein are only examples. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

While a number of exemplary aspects and embodiments have been discussed above, those of skill in the art will recognize certain modifications, permutations, additions and sub-combinations thereof. For example:

Method 100 of FIG. 2 depicts a process which involves designation (in block 102) of components of video content 10 to be master component and slave components. As discussed above, there is a number of methods of implementing block 102 in accordance with various embodiments of the invention. The result of component designation block 102 is designated video content 10B. Method 100 also depicts a process of color grading (in block 108) which involves receiving (as input) designated video content 10B and color grading designated video content 10B to generate color graded output video content 10C. In some embodiments, the block 102 component designation and the block 108 color grading process can take place independently of one another. For example, some embodiments of the invention comprise methods for color grading video content that is already or independently provided in the form of designated video content 10B and some embodiments of the invention comprise generating designated video content 10B without expressly color grading the designated video content 10B.

Method 200 of FIG. 5 depicts a process which involves determining importance metrics (in block 212) for components of video content 210A. As discussed above, there is a number of bases on which the block 212 importance metrics may be based. The result of determining the block 212 importance metrics is importance-assigned video content 210B. Method 200 also depicts a process of performing trim pass color grading (in block 214) which involves receiving (as input) importance-assigned video content 210B and performing trim pass color grading on importance-assigned video content 210B to generate trim passed output video content 210C. In some embodiments, the block 212 importance metric determination and the block 214 trim pass color grading process can take place independently of one another. For example, some embodiments of the invention comprise methods for performing a trim pass on video content that is already or independently provided in the form of importance-assigned video content 210B and some embodiments of the invention comprise determining importance-assigned video content 210B without expressly performing the block 214 trim pass on the importance-assigned video content 210B.

The embodiments discussed herein are described as being applicable to video content. It is not necessary that the techniques described herein are applied strictly to video content. In the context of this description and the accompanying claims, unless specified otherwise, video content should be understood to include any image data comprising a plurality of components (e.g. frames, shots and/or scenes).

Systems, computer program products and corresponding methods may be embodied in the form of plug-in modules to existing color grading software (e.g. color suite software) and systems.

Accordingly, this invention should be interpreted in accordance with the following claims.

What is claimed is:

1. A method for color grading video content, the method performed by a processor and comprising:
by apparatus comprising one or more data processors configured by software, one or more programmable logic devices, one or more logic circuits or a combination thereof:
accessing input video content comprising one or more video frames;
designating a particular component of the input video content to be a master component;
designating one or more other components of the input video content to be slave components, each slave component associated with the master component;
performing by a processor a master component color grading operation to the master component;
for each one of the slave components:
performing by a processor the master component color grading operation to the slave component; and
performing by a processor a slave color grading operation that is specific to the one of the slave components; and,
generating output video content based on the master and slave color grading operations.

2. A method according to claim 1 wherein designating the particular component of the input video content to be the master component comprises: identifying a plurality of associated components of the input video content; and selecting one component, from within the plurality of associated components, to be the master component.

3. A method according to claim 2 wherein identifying the plurality of associated components of the input video content comprises determining the plurality of components because the plurality of components share common acquisition metadata.

4. A method according to claim 2 wherein identifying the plurality of associated components of the input video content comprises determining image statistics for each component and concluding that the plurality of components is associated because the plurality of components have image statistics that fall within a proximity threshold.

5. A method according to claim 1 wherein designating the particular component of the input video content to be the master component comprises creating metadata associated with the particular component, the metadata forming part of the input video content and providing an indicator that the particular component is the master component.

6. A method according to claim 5 wherein creating the metadata associated with the particular component comprises creating a flag indicating that the particular component is the master component.

7. A method according to claim 5 wherein creating the metadata associated with the particular component comprises creating a master pointer field, the master pointer field referring to the particular component.

8. A method according to claim 5 wherein creating the metadata associated with the particular component comprises creating a slave pointer field, the slave pointer field referring to the one or more other components which are designated to be slave components.

9. A method according to claim 1 wherein designating the one or more other components of the input video content to be slave components comprises creating metadata associated with the one or more other components, the metadata forming part of the input video content and indicating that the one or more other components are the slave components.

10. A method according to claim 9 wherein creating metadata associated with the one or more other components comprises, for each particular one of the one or more other components, creating a flag indicating that the particular one of the one or more other component is a slave component.

11. A method according to claim 9 wherein creating metadata associated with the one or more other components comprises, for each particular one of the one or more other components, creating a master pointer field, the master pointer field referring to the master component.

12. A method according to claim 9 wherein creating metadata associated with the one or more other components comprises, for each particular one of the one or more other components, comprises creating a slave pointer field, the slave pointer field referring to the particular one of the one or more other components.

13. A method according to claim 1 wherein:
designating the particular component of the input video content to be the master component comprises designating the particular component to be a LEVEL 1 component;
designating the one or more other components of the input video content to be the slave components comprises designating a first subset of the one or more other components to be LEVEL 2 components and designating a second subset of the one or more other components to be LEVEL 3 components;
the method further comprises:
performing a LEVEL 2 color grading operation to the LEVEL 2 components; and
for each one of the LEVEL 3 components:
performing the LEVEL 2 color grading operation to the LEVEL 3 component; and
performing a LEVEL 3 color grading operation that is specific to the one of the LEVEL 3 components.

14. A method according to claim 13 wherein designating the particular component to be the LEVEL 1 component comprises creating metadata associated with the particular component, the metadata forming part of the input video content and providing an indicator that the particular component has been designated as the LEVEL 1 component.

15. A method according to claim 14 wherein creating the metadata associated with the particular component comprises creating a LEVEL 1 pointer field, the LEVEL 1 pointer field referring to the particular component.

16. A method according to claim 14 wherein creating the metadata associated with the particular component comprises creating a slave pointer field, the slave pointer field referring to the LEVEL 2 components and the LEVEL 3 components.

17. A method according to claim 14 wherein designating the first subset of the one or more other components to be the LEVEL 2 components comprises creating metadata associated with the first subset of the one or more other components, the metadata forming part of the input video content and indicating that the first subset of the one or more other components has been designated as the LEVEL 2 components.

18. A method according to claim 17 wherein creating the metadata associated with the first subset of the one or more other components comprises, for each particular one of the first subset of the one or more other components, creating a LEVEL 1 pointer field, the LEVEL 1 pointer field referring to the LEVEL 1 component.

19. A method according to claim 17 wherein creating the metadata associated with the first subset of the one or more other components comprises, for each particular one of the first subset of the one or more other components, creating a LEVEL 3 pointer field, the LEVEL 3 pointer field referring to the second subset of the one or more other components.

20. A method according to claim 14 wherein designating the second subset of the one or more other components to be the LEVEL 3 components comprises creating metadata associated with the second subset of the one or more other components, the metadata forming part of the input video content and indicating that the second subset of the one or more other components has been designated as the LEVEL 3 components.

21. A method according to claim 20 wherein creating the metadata associated with the second subset of the one or more other components comprises, for each particular one of the second subset of the one or more other components, creating a master pointer field, the master pointer field referring to the LEVEL 1 component and the LEVEL 2 components.

22. A method according to claim 20 wherein creating the metadata associated with the second subset of the one or more other components comprises, for each particular one of the second subset of the one or more other components, creating a LEVEL 3 pointer field, the LEVEL 3 pointer field referring to the particular one of the second subset of the one or more other components.

23. A system for processing video content, the system comprising a processor configured to:
by apparatus comprising one or more data processors configured by software, one or more programmable logic devices, one or more logic circuits or a combination thereof:
accessing input video content comprising one or more video frames;
designate a particular component of the input video content to be a master component;
designate one or more other components of the input video content to be slave components, each slave component associated with the master component;
perform a master component color grading operation to the master component;
for each one of the slave components:
perform the master component color grading operation to the slave component; and
perform a slave color grading operation that is specific to the one of the slave components; and,
generating output video content based on the master and slave color grading operations.

24. A computer program product embodied on a non-transitory medium, the computer program product comprising computer-readable instructions which, when executed by one or more data processors configured by software, one or more programmable logic devices, one or more logic circuits or a combination thereof, cause the one or more processors to perform a method for color grading video content, the method comprising:
accessing input video content comprising one or more video frames;
designating a particular component of the input video content to be a master component;
designating one or more other components of the input video content to be slave components, each slave component associated with the master component;
performing a master component color grading operation to the master component;
for each one of the slave components:
performing the master component color grading operation to the slave component; and
performing a slave color grading operation that is specific to the one of the slave components; and
generating output video content based on the master and slave color grading operations.

* * * * *